(12) United States Patent
Woo et al.

(10) Patent No.: US 7,985,817 B2
(45) Date of Patent: Jul. 26, 2011

(54) HOMOGENEOUS CATALYST SYSTEM FOR PRODUCING ETHYLENE HOMOPOLYMER OR ETHYLENE COPOLYMERS WITH ALPHA-OLEFINS

(75) Inventors: Tae Woo Woo, Daejeon (KR); Myung Ahn Ok, Daejeon (KR); Jong Sok Hahn, Daejeon (KR); Sang Ook Kang, Seoul (KR); Jae Ho Jung, Incheon (KR)

(73) Assignee: SK Energy Co., Ltd., Seoul (KR)

( * ) Notice: Subject to any disclaimer, the term of this patent is extended or adjusted under 35 U.S.C. 154(b) by 175 days.

(21) Appl. No.: 12/065,974

(22) PCT Filed: Sep. 8, 2006

(86) PCT No.: PCT/KR2006/003583
§ 371 (c)(1),
(2), (4) Date: Mar. 6, 2008

(87) PCT Pub. No.: WO2007/029986
PCT Pub. Date: Mar. 15, 2007

(65) Prior Publication Data
US 2008/0262174 A1    Oct. 23, 2008

(30) Foreign Application Priority Data

Sep. 9, 2005  (KR) ........................ 10-2005-0084108
Sep. 7, 2006  (KR) ........................ 10-2006-0086200

(51) Int. Cl.
*C08F 4/52*  (2006.01)
*C08F 4/64*  (2006.01)
*C08F 4/76*  (2006.01)
*B01J 31/14*  (2006.01)
*B01J 31/38*  (2006.01)

(52) U.S. Cl. ........ 526/161; 526/160; 526/170; 526/172; 526/134; 526/131; 526/148; 526/153; 526/151; 526/348; 526/352; 526/348.6; 526/348.5; 526/348.3; 526/348.2; 502/113; 502/114; 502/132

(58) Field of Classification Search .............. 556/51, 556/52; 502/103; 526/161, 172, 126, 134
See application file for complete search history.

(56) References Cited

U.S. PATENT DOCUMENTS
5,057,475 A * 10/1991 Canich et al. ............ 502/104
(Continued)

FOREIGN PATENT DOCUMENTS
EP  0277004  8/1988
(Continued)

OTHER PUBLICATIONS

Oh et al., JP 2002-030109 (Jan. 2002); abstract and translation in English.*

*Primary Examiner* — Rip A. Lee
(74) *Attorney, Agent, or Firm* — McDermott Will & Emery LLP (57) ABSTRACT

Disclosed is a homogeneous catalyst system for producing an ethylene homopolymer or an ethylene copolymer with α-olefin. Specifically, this invention pertains to a transition metal catalyst which has stability under high temperature solution polymerization at 120~250° C., in which a cyclopentadiene derivative and an electron donating substituent, both of which are bonded to a Group IV transition metal acting as a central metal, are crosslinked through a silyl derivative substituted with a cyclohexyl, to a catalyst system including such a transition metal catalyst and an aluminoxane cocatalyst or a boron compound cocatalyst, and to a method of producing an ethylene homopolymer or an ethylene copolymer with α-olefin, having high molecular weight, using the catalyst system under conditions of high-temperature solution polymerization. The catalyst according to this invention has excellent thermal stability and compatibility with a paraffin hydrocarbon solvent and thus is effective in the production of an ethylene homopolymer or an ethylene copolymer with α-olefin having various properties in commercial polymerization processes.

6 Claims, 3 Drawing Sheets

U.S. PATENT DOCUMENTS

| | | | |
|---|---|---|---|
| 5,064,802 A | 11/1991 | Stevens et al. | |
| 5,084,534 A | 1/1992 | Welborn, Jr. et al. | |
| 5,103,030 A | 4/1992 | Rohrmann et al. | |
| 5,504,169 A * | 4/1996 | Canich | 526/127 |
| 5,631,391 A * | 5/1997 | Canich | 556/11 |
| 5,652,315 A | 7/1997 | Inoue et al. | |
| 5,861,352 A | 1/1999 | Gila et al. | |
| 6,207,773 B1 * | 3/2001 | Ting et al. | 526/127 |
| 6,300,433 B1 | 10/2001 | Rodriguez et al. | |
| 2006/0135712 A1 | 6/2006 | Satoh et al. | |

FOREIGN PATENT DOCUMENTS

| | | | |
|---|---|---|---|
| EP | 320762 | | 6/1989 |
| EP | 0416815 | | 3/1991 |
| EP | 0420436 | | 4/1991 |
| JP | 63-092621 | | 4/1988 |
| JP | 06-049132 | | 2/1994 |
| JP | 2002-030109 | * | 1/2002 |
| JP | 2003-002347 | | 1/2003 |
| JP | 2004-217927 | | 8/2004 |

* cited by examiner

HOMOGENEOUS CATALYST SYSTEM FOR PRODUCING ETHYLENE HOMOPOLYMER OR ETHYLENE COPOLYMERS WITH ALPHA-OLEFINS

CROSS REFERENCE TO PRIOR APPLICATION

This application is the U.S. national phase of International Application No. PCT/KR2006/003583 filed Sep. 8, 2006, which claims priority from Korean Application No. 10-2005-0084108, filed Sep. 9, 2005 and Korean Application No. 10-2006-0086200, filed Sep. 7, 2006. The International Application was published in English on Mar. 15, 2007 as WO 2007/029986 A1 under PCT Article 21(2).

TECHNICAL FIELD

The present invention relates to homogeneous catalyst systems for producing ethylene homopolymers or ethylene copolymers with α-olefins, and more specifically, to a Group IV transition metal catalyst which has a stability under a high temperature at 120~250° C., in which a cyclopentadiene derivative and an electron donating substituent, both of which are bonded to a Group IV transition metal, are crosslinked through a silyl derivative substituted with a cyclohexyl, to a catalyst system comprising such a transition metal catalyst and an aluminoxane cocatalyst or a boron compound cocatalyst, and to a method of producing an ethylene homopolymer or an ethylene copolymer with α-olefin using the catalyst system.

BACKGROUND ART

Conventionally, ethylene homopolymers or ethylene copolymers with α-olefins have been produced using a so-called Ziegler-Natta catalyst system comprising a titanium compound or a vanadium compound, serving as a main catalyst, and an alkyl aluminum compound, serving as a cocatalyst. Although the Ziegler-Natta catalyst system is highly active in the polymerization of ethylene, it has heterogeneous active sites, leading to a polymer having a wide molecular weight distribution, and in particular, an ethylene copolymer with α-olefin having a non-uniform composition distribution.

Recently, the development of a metallocene catalyst system, comprising a metallocene compound of Group IV transition metal in the periodic table, such as titanium, zirconium, or hafnium, and a methylaluminoxane cocatalyst, has been realized. Since the metallocene catalyst system is a homogeneous catalyst having a single active site, it has a characteristic of being able to produce polyethylene having a narrower molecular weight distribution and a more uniform composition distribution than when using conventional Ziegler-Natta catalyst systems. For example, EP Laid-open Publication Nos. 320762 and 3726325 or Japanese Patent Laid-open Publication No. Sho. 63-092621 and Japanese Patent Laid-open Publication Nos. Hei. 02-84405 and 03-2347 disclose metallocene compounds, such as $Cp_2TiCl_2$, $Cp_2ZrCl_2$, $Cp_2ZrMeCl$, $Cp_2ZrMe_2$, or ethylene$(IndH_4)_2ZrCl_2$, activated with methylaluminoxane as a cocatalyst to polymerize ethylene at high catalytic activity, thereby making it possible to produce polyethylene having molecular weight distribution (Mw/Mn) of 1.5~2.0.

However, it is difficult to obtain polymers having high molecular weights using the above catalyst system. Further, in the case where such a catalyst system is applied to solution polymerization at high temperatures of 140° C. or more, polymerization activity is drastically decreased, and β-dehydrogenation mainly occurs, and thus the catalyst system is known to be unsuitable for the production of high molecular weight polymers having a weight average molecular weight (Mw) of 100,000 or more.

Moreover, U.S. Pat. No. 5,084,534, granted to Exxon, discloses the production of a copolymer having a narrow molecular weight distribution of 1.8~3.0 and a uniform composition distribution by homopolymerizing ethylene or copolymerizing ethylene with 1-hexene or 1-octene at 150~200° C. using a $(n-BuCp)_2ZrCl_2$ catalyst and a methylaluminoxane cocatalyst. In addition, EP Nos. 0416815 and 0420436, granted to Dow, disclose a catalyst having a geometrically constrained structure in which an amide group is linked to a single cyclopentadiene ligand to form the shape of a ring. The disclosed catalyst is highly active in the homopolymerization of ethylene or the copolymerization of ethylene with α-olefin not only in slurry polymerization but also in solution polymerization, and thus it is possible to produce a high molecular weight polymer having excellent reactivity with the comonomer and uniform composition distribution. However, such a catalyst system is disadvantageous because the stability thereof is drastically decreased as the temperature increases under conditions of high-temperature solution polymerization at 140° C. or more, and compatibility with a paraffin hydrocarbon solvent, typically used in commercial processes, is poor.

Although U.S. Pat. No. 6,207,773 discloses a metallocene catalyst in which cyclopentadiene derivative and an electron donating substituent, both of which are bonded to a Group IV transition metal, are crosslinked through a silyl derivative substituted with a cyclic hydrocarbon, it does not show suitable property for high-temperature solution polymerization.

DISCLOSURE

Technical Problem

Leading to the present invention, intensive and thorough research on catalyst systems, carried out by the present inventors, aiming to overcome the problems encountered in the prior art, led to the development of a catalyst which is suitable for use in the production of an ethylene homopolymer or an ethylene copolymer with α-olefin, having a high molecular weight, at high activity through solution polymerization at high temperatures of 120~250° C. and which has good compatibility with a paraffin hydrocarbon solvent, based on the finding that a constrained geometry catalyst obtained by crosslinking a cyclopentadiene derivative and an electron donating substituent using a silyl derivative substituted with a cyclohexyl has greatly increased high-temperature stability.

Accordingly, object of the present invention is to provide a single-site catalyst having superior thermal stability and good compatibility with a paraffin hydrocarbon solvent, which makes it possible to use a high temperature polymerization which allows to easily produce an ethylene homopolymer or an ethylene copolymer with α-olefin, in a commercial point or view.

Another object of the present invention is to provide a catalyst system comprising the single-site catalyst mentioned above for the high temperature solution polymerization and a cocatalyst for the system.

Another object of the present invention is to provide polymerization method using the catalyst system.

Technical Solution

In order to accomplish the above object, the present invention provides a homogeneous catalyst for producing an ethylene polymer as single-site catalyst having thermal stability under high-temperature solution polymerization at 120~250° C., in which a cyclopentadiene derivative and an electron donating substituent, both of which are bonded to a Group IV transition metal, are crosslinked through a silyl derivative substituted with a cyclohexyl, the homogeneous catalyst being represented by Formula 1 below:

Formula 1 wherein M is a Group IV transition metal in the periodic table;

Cp is cyclopentadienyl or a derivative thereof, which is able to be $\eta^5$-bonded to a central metal;

D is an electron donating substituent including any one element selected from the group consisting of nitrogen, phosphorus, oxygen, and sulfur, with a C1~C20 alkyl group;

X is a halogen atom, a C1~C20 alkyl group with the exception of Cp derivatives, a C7~C30 arylalkyl group, a C1~C20 alkyl-containing alkoxy group, a C3~C20 alkyl-substituted siloxy group, or a C1~C20 hydrocarbon-containing amido group;

m is 3; and n is 1 or 2 depending on the oxidation value of the transition metal.

In addition, the present invention provides a catalyst system, comprising the homogeneous catalyst having stability under high temperature solution polymerization at 120~250° C., being represented above formula 1, in which, a cyclopentadiene derivative and an electron donating substituent, both of which are bonded to a Group IV transition metal, are crosslinked through a silyl derivative substituted with a cyclic hydrocarbon, and an aluminum or boron compound cocatalyst.

In addition, the present invention provides a method of producing an ethylene homopolymer or an ethylene copolymer with α-olefin using the catalyst system in which the pressure in reaction system is 10~150 atm, and polymerization is conducted at 120~250° C. In case that the method of producing an ethylene copolymer with α-olefin using the catalyst system, in which α-olefin polymerized with ethylene monomer is at least one selected from the group consisting of 1-butene, 1-hexene, 1-octene, and 1-decene, and the copolymer has 60 wt % or more ethylene.

Advantageous Effects

According to the present invention, the catalyst has excellent thermal stability, is effective in solution polymerization at high temperatures of 120~250° C., and has good compatibility with a paraffin hydrocarbon solvent, and thus may be easily commercially applied. In addition, polyethylene created using the catalyst of the present invention can be easily controlled with respect to molecular weight, molecular weight distribution, and density, and high molecular weight polymers can be synthesized even under conditions of high-temperature polymerization.

BEST MODE

Hereinafter, a detailed description will be given of the present invention.

The single active site catalyst of present invention, as represented by followed formula 1, relates to a homogeneous catalyst for producing an ethylene polymer, which has thermal stability under high-temperature solution polymerization at 120~250° C., in which a cyclopentadiene derivative and an electron donating substituent, both of which are bonded to a Group IV transition metal, are crosslinked through a silyl derivative substituted with a cyclohexyl.

Formula 1

In the transition metal complex represented by Formula 1, M is preferably titanium, zirconium or hafnium. Further, Cp is a cyclopentadiene anion or derivative thereof, which may be $\eta^5$-bonded to a central metal, specific examples thereof including cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, isopropylfluorenyl, etc.

D is an electron donating substituent comprising any one element selected from the group consisting of nitrogen, phosphorus, oxygen and sulfur, with a C1~C20 alkyl group, and more specifically is an electron donating substitutent, which is composed of any one selected from among the above element group and an alkyl group such as a methyl group, an ethyl group, a propyl group, an isopropyl group, a tert-butyl group, a cyclohexyl group, a dicyclohexylmethyl group, a phenyl group, a methylphenyl group, an adamentyl group, etc. More preferably, such an electron donating substituent is an amido group or a phosphido group substituted with a tert-butyl group or an adamentyl group.

The electron donating substitutent D and the cyclopentadiene derivative are crosslinked through a silyl derivative substituted with a cyclic hydrocarbon, as represented by Formula 1. As such, the silyl derivative substituted with the cyclic hydrocarbon functions to increase compatibility with a paraffin hydrocarbon solvent and to enhance structural stability of the catalyst itself so as to increase the activity of the catalyst upon high-temperature polymerization at 120° C. or more. Particularly, the silyl derivative having a hexagonal ring structure which comes under the condition that m is 3, causing less ring strain is present in various isomers including chair- and boat-shapes, such that the catalyst may absorb or emit external thermal vibrations, thereby greatly increasing the structural stability of the catalyst.

X is a halogen atom, for example, fluorine, chlorine, bromine, or iodine; a C1~C20 alkyl group with the exception of Cp derivatives, for example, a methyl group, an ethyl group, an n-propyl group, an isopropyl group, an n-butyl group, a sec-butyl group, a tert-butyl group, an n-pentyl group, a neo-pentyl group, an amyl group, an n-hexyl group, an n-octyl group, an n-decyl group, an n-dodecyl group, an n-pentadecyl group, or an n-eicosyl group, and preferably, a methyl group, an ethyl group, an isopropyl group, a tert-butyl group, or an amyl group; a C7~C30 arylalkyl group, for example, a benzyl group, a (2-methylphenyl)methyl group, a (3-methylphenyl) methyl group, a (4-methylphenyl)methyl group, a (2,3-dimethylphenyl)methyl, (2,4-dimethylphenyl)methyl group, a (2,5-dimethylphenyl)methyl group, a (2,6-dimethylphenyl) methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl) methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl) methyl group, an (n-propylphenyl)methyl group, an (iso-propylphenyl)methyl group, an (n-butylphenyl)methyl group, a (sec-butylphenyl) methyl group, a (tert-butylphenyl)methyl group, an (n-pentylphenyl)methyl group, a (neopentylphenyl)methyl group, an (n-hexylphenyl)methyl group, an (n-octylphenyl)methyl group, an (n-decylphenyl)methyl group, an (n-decylphenyl) methyl group, an (n-tetradecylphenyl)methyl group, a naphthylmethyl group, or an anthracenylmethyl group, and preferably, a benzyl group; a C1~C20 alkoxy group, for example, a methoxy group, an ethoxy group, an n-propoxy group, an isopropoxy group, an n-butoxy group, a sec-butoxy group, a tert-butoxy group, an n-pentoxy group, a neopentoxy group, an n-hexoxy group, an n-octoxy group, an n-dodecoxy group, an n-pentadecoxy group, or an n-eicosoxy group, and preferably, a methoxy group, an ethoxy group, an isopropoxy group, or a tert-butoxy group; a C3~C20 alkyl-substituted siloxy group, for example, a trimethylsiloxy group, a triethylsiloxy group, a tri-n-propylsiloxy group, a triisopropylsiloxy group, a tri-n-butylsiloxy group, a tri-sec-butylsiloxy group, a tri-tert-butylsiloxy group, a tri-isobutylsiloxy group, a tert-butyldimethylsiloxy group, a tri-n-pentylsiloxy group, a tri-n-hexylsiloxy group, or a tricyclohexylsiloxy group, and preferably a trimethylsiloxy group or a tert-butyldimethylsiloxy group; a C1~C20 hydrocarbon-containing amido group or phosphido group, for example, a dimethylamino group, a diethylamino group, a di-n-propylamino group, a diisopropylamino group, a di-n-butylamino group, a di-sec-butylamino group, a di-tert-butylamino group, a diisobutylamino group, a tert-butylisopropylamino group, a di-n-hexylamino group, a di-n-octylamino group, a di-n-decylamino group, a diphenylamino group, a dibenzylamide group, a methylethylamide group, a methylphenylamide group, a benzylhexylamide group, a bistrimethylsilylamino group, or a bis-tert-butyldimethylsilylamino group, or phosphido groups substituted with the same alkyls as above, and preferably a dimethylamino group, a diethylamino group or a diphenylamino group.

The transition metal catalyst represented by Formula 1 may be synthesized through typical methods, and the specific synthesis method thereof is exemplified as follows.

First, a cyclopentadienyl lithium compound and silacycloalkane dihalide or silacycloalkenyl dihalide are quantitatively reacted at −78~50° C., and a reaction product is separated. The separated product is reacted with a lithium salt of any one compound selected from the group consisting of $R^1R^2NCH_2NR^3R^4$, $NH_2NR^1R^2$, $NH_2PR^1R^2$, $PH_2NR^2R^2$, and $PH_2PR^1R^2$ at a molar ratio of 1:2 or more, at −78~50° C. and the reaction product is separated, yielding a ligand compound. As such, Cp is a cyclopentadienyl derivative, silacycloalkane dihalide or silacycloalkenyl dihalide is selected from C4~C6 silacycloalkanes or silacycloalkenyls and Cl or Br, and $R^1$, $R^2$, $R^3$, and $R^4$, which are the same as or different from each other, are hydrogen or a C1~C20 hydrocarbon radical.

Further, solvent that can be used in the above reactions includes diethylether, tetrahydrofuran (THF), n-pentane, n-hexane, toluene, benzene, dichloromethane, etc.

The ligand compound thus synthesized is reacted with any one selected from the group consisting of n-BuLi and Grignard reagents, for example, BuMgCl, EtMgCl, and MeMgCl at a molar ratio of 1:2 at −78~50° C. to form an anion thereof, which is then reacted with a compound represented by $MX_o$ or $MX_o(6-o)THF$ at a molar ratio of 1:1 at −78~50° C. As such, M is Ti, Zr, or Hf; X is a halogen atom, a C1~C20 alkyl group with the exception of Cp derivatives, a C7~C30 arylalkyl group, a C1-C20 alkyl-containing alkoxy group, a C3~C20 alkyl-substituted siloxy group, or a C1~C20 hydrocarbon-containing amido group; and o is an integer of 3 or 4.

Subsequently, the product is precipitated in diethylether or n-pentane, and the dissolved solution portion is recrystallized, followed by separating a precipitate from the solution, thus synthesizing a transition metal complex compound catalyst represented by Formula 1.

Alternatively, the synthesized ligand compound and a compound represented by $ML_4$ are reacted at a molar ratio of 1:1 at 0~200° C. without the use of a solvent, and extracted through a sublimation crystallization process under reduced pressure, thus synthesizing the compound represented by Formula 1. As such, M is Ti, Zr or Hf, and L is $NR^5R^6$, $PR^5R^6$, $OR^7$ or $SR^7$, in which $R^5$, $R^6$ and $R^7$ are independently each a C1~C20 alkyl group or aryl group.

In order to use the transition metal catalyst represented by Formula 1 as an active catalyst for use in the production of an ethylene homopolymer or an ethylene copolymer with an α-olefin comonomer, it requires a cocatalyst that may act as an anion as a counter ion having a weak bonding force while causing the central metal to be a cation through extraction of the ligand X from the catalyst. Typically, an aluminoxane compound or a boron compound may be used.

As the aluminoxane compound used in the present invention, an aluminoxane compound represented by Formula 2 or 3 below, which is known in the art, is mainly used.

Formula 2

Formula 3 wherein $R^8$ is a C1~C20 alkyl group, and p and q are each an integer of 5 or more.

With the goal of using the transition metal catalyst of the present invention as an actual active catalyst, the two components thereof may be mixed at a molar ratio of central metal to aluminum of 1:20~1:10,000, and preferably 1:50~1:5,000.

In addition, the boron compound cocatalyst used in the present invention, which is disclosed in U.S. Pat. No. 5,198,401, may be selected from the group of compounds represented by Formulas 4 to 6 below:

Formula 4

Formula 5

Formula 6 wherein B is a boron atom;

R⁹ is an unsubstituted phenyl group or a phenyl group substituted with 3~5 substituents selected from fluorine-substituted or unsubstituted C1~C4 alkyl groups and fluorine-substituted or unsubstituted C1~C4 alkoxy groups;

R¹⁰ is a C5~C7 cyclic aromatic cation or alkyl-substituted aromatic cation, for example, a triphenylmethyl cation;

Z is a nitrogen atom or a phosphorus atom;

R¹¹ is a C1~C4 alkyl radical, or taken together with a nitrogen atom forms an anilinium radical which is substituted with two C1~C4 alkyl groups; and r is an integer of 2 or 3.

The preferred examples of the boron cocatalyst include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-tetrafluorophenyl)borate, tetrakis(2,2,4-trifluorophenyl)borate, phenylbis(pentafluorophenyl)borate, and tetrakis(3,5-bistrifluoromethylphenyl)borate. Further, specific combination examples thereof include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, or tri(dimethylphenyl)phosphonium tetrakis(pentafluorophenyl)borate. In particular, N,N-dimethylanilinium tetrakispentafluorophenylborate, triphenylmethylinium tetrakispentafluorophenylborate or trispentafluoroborane is preferable.

In the catalyst system using the boron cocatalyst, the molar ratio of central metal to boron atom is 1:0.01~1:100, and preferably 1:0.5~1:5.

In addition, a mixture of boron compound and organic aluminum compound or a mixture of boron compound and aluminoxane may be used, if necessary. As such, the aluminum compound may be used to remove a polar compound acting as a catalyst poison in the reaction solvent, or may function as an alkylating agent when X of the catalyst is halogen.

Further, the organic aluminum compound is represented by Formula 7 below:

Formula 7 wherein R¹² is a C1~C8 alkyl group;

E is a hydrogen atom or a halogen atom; and s is an integer from 1 to 3.

Specific examples of the organic aluminum compound include trialkylaluminum, including trimethylaluminum, triethylaluminum, tripropylaluminum, triisobutylaluminum, and trihexylaluminum; dialkylaluminum chloride, including dimethylaluminum chloride, diethylaluminum chloride, dipropylaluminum chloride, diisobutylaluminum chloride, and dihexylaluminum chloride; alkylaluminum dichloride, including methylaluminum dichloride, ethylaluminum dichloride, propylaluminum dichloride, isobutylaluminum dichloride, and hexylaluminum dichloride; and dialkylaluminum hydride, including dimethylaluminum hydride, diethylaluminum hydride, dipropylaluminum hydride, diisobutylaluminum hydride, and dihexylaluminum hydride. In particular, trialkylaluminum is preferable, and triethylaluminum and triisobutylaluminum are more preferable.

As such, the molar ratio of central metal to boron atom to aluminum atom is 1:0.1~100:10~1,000, and preferably 1:0.5~5:25~500.

In addition, the present invention provides a method of producing an ethylene polymer using the transition metal catalyst system, which is conducted by bringing the transition metal catalyst and the cocatalyst into contact with ethylene or a vinyl comonomer, if necessary, in the presence of an appropriate organic solvent. As such, the transition metal catalyst and the cocatalyst may be separately introduced into a reactor or may be mixed together and then introduced into a reactor, with no particular limitation as to mixing conditions, such as introduction sequence, temperature, or concentration.

The organic solvent used in the production method of the present invention includes C3~C20 hydrocarbons, and preferably paraffin hydrocarbon. Specific examples of the solvent used in the above production method include butane, isobutane, pentane, hexane, heptane, octane, iso-octane, nonane, decane, dodecane, cyclohexane, methylcyclohexane, benzene, toluene, and xylene.

Specifically, when high density polyethylene (HDPE) as the ethylene homopolymer is prepared, ethylene is used alone as the monomer, the pressure of ethylene suitable therefor being 1~1000 atm, and preferably 10~150 atm. Moreover, the polymerization is conducted at 80~300° C., and preferably 120~250° C.

Generally, when solution polymerization is carried out in condition of such a high temperature, it is difficult to obtain polymer having desirable property, because as the temperature at reactor increases, activity of the catalyst decreases by deformation or deterioration of the catalyst.

But ethylene polymerization catalyst of present invention has stability under high temperature solution polymerization at 120~250° C. and does not show dramatically decreasing activity. More preferably the catalyst shows stable activity at 140~210° C. Such an activity, For example, as following Example, brings a stable polymer output using high temperature solution polymerization.

Further, when the copolymer of ethylene and u-olefin is produced, the comonomer used together with ethylene is exemplified by C3~C18 α-olefins, and preferably may be selected from the group consisting of propylene, 1-butene, 1-pentene, 4-methyl-1-pentene, 1-hexene, 1-octene, 1-decene, 1-dodecene, 1-hexadecene, and 1-octadecene. More preferably, the copolymerization of 1-butene, 1-hexene, 1-octene or 1-decene and ethylene is effective. As such, the preferred pressure of ethylene and temperature of polymerization are the same as in the production of HDPE. The ethylene copolymer produced according to the method of the present invention contains 60 wt % or more ethylene, and preferably 75 wt % or more ethylene. In this way, linear low density polyethylene (LLDPE) prepared using C4~C10 α-olefin as a comonomer has a density of 0.910~0.935 g/cc, and ultra-low density polyethylene (VLDPE or ULDPE) having a density of 0.910 g/cc or less may be produced. Further, upon production of the ethylene homopolymer or copolymer, hydrogen may be used as a molecular weight controlling agent to control the molecular weight of the polymer. Typically, the polymer has a weight average molecular weight (Mw) of 80,000~500,000.

Since the catalyst system of the present invention is homogeneously present in the polymerization reactor, it may be applied to solution polymerization, which requires a temperature not lower than the melting point of the corresponding polymer. In addition, the above transition metal catalyst and cocatalyst may be supported on a porous metal oxide support to form a heterogeneous catalyst system suitable for application to slurry polymerization or vapor polymerization, which is disclosed in U.S. Pat. No. 4,752,597.

MODE FOR INVENTION

A better understanding of the present invention may be obtained through the following examples which are set forth to illustrate, but are not to be construed to limit the present invention.

All tests of ligand and catalyst synthesis were conducted in a nitrogen atmosphere using standard Schlenk and glovebox techniques, except when noted otherwise. The organic solvent used in the reaction was refluxed in the presence of sodium metal and benzophenone to remove water therefrom and was then distilled just before use. $^1$H-NMR analysis of the synthesized ligand and catalyst was conducted at room temperature using a Varian Oxford 300 MHz spectrometer.

As a polymerization solvent, n-heptane was used by passing it through a column packed with molecular sieve 5A and activated alumina, and then bubbling it with highly pure nitrogen to sufficiently remove water, oxygen and other catalyst poison materials. The resultant polymer was analyzed using the following processes.

1. Analysis of Melting Point (Tm)

Using Dupont DSC2910, the Tm was measured at a rate of 10° C./min under $2^{nd}$ heating conditions in a nitrogen atmosphere.

2. Molecular Weight and Molecular Weight Distribution

Using PL210 GPC equipped with PL Mixed-BX2+preCol, the molecular weight and molecular weight distribution were determined at 135° C. at a rate of 1.0 ml/min in the presence of a 1,2,3-trichlorobenzene solvent, and the molecular weight was corrected using PL polystyrene standard material.

Example 1

Synthesis of (tert-Butylamido)(2,3,4,5-Tetramethylcyclopenta-2,4-Dienyl)Silacyclohexane Into a flask containing 100 ml of tetrahydrofuran, 2,3,4,5-tetramethylcyclopenta-2,4-diene (3.67 g, 30 mmol) was added, and then n-butyl lithium (12 ml) was added in droplets thereto at 0° C. The reaction temperature was gradually increased to room temperature, and the reaction mixture was allowed to react for 8 hours. The temperature of the reaction solution was decreased to −78° C., after which the reaction solution was added with dichlorosilacyclohexane (5.07 g, 30 mmol) and then allowed to react for 12 hours. After the reaction, volatile material was removed, the resultant reaction product was extracted with 100 ml of hexane, and more volatile material was removed, thus obtaining 7.01 g of chloro-2,3,4,5-tetramethylcyclopentadienyl silacyclohexane as light yellow oil. Subsequently, the chloro-2,3,4,5-tetramethylcyclopentadienyl silacyclohexane thus obtained was dissolved in 100 ml of tetrahydrofuran, without additional purification, and 2.18 g of lithium tert-butylamide was added in droplets thereto at 0° C., after which the reaction mixture was allowed to react at room temperature for 2 hours. After the reaction, the volatile material was removed, the resultant reaction product was extracted with 100 ml of hexane, and more volatile material was removed, thus obtaining 7.42 g of (tert-butylamido)(2,3,4,5-tetramethylcyclopenta-2,4-dienyl)silacyclohexane as light yellow oil.

Yield: 85%, $^1$H-NMR (CDCl$_3$) δ=0.75-0.77 (t, 4H), 1.06 (s, 9H), 1.14-1.19 (m, 4H), 1.70-1.72 (m, 2H), 1.82 (s, 6H), 1.97 (s, 6H), 2.96 (s, 1H) ppm Synthesis of (Dichloro)((tert-Butylamido)(2,3,4,5-Tetramethylcyclopentadienyl)Silayclohexyl)Titanium(IV)

Figure 1:
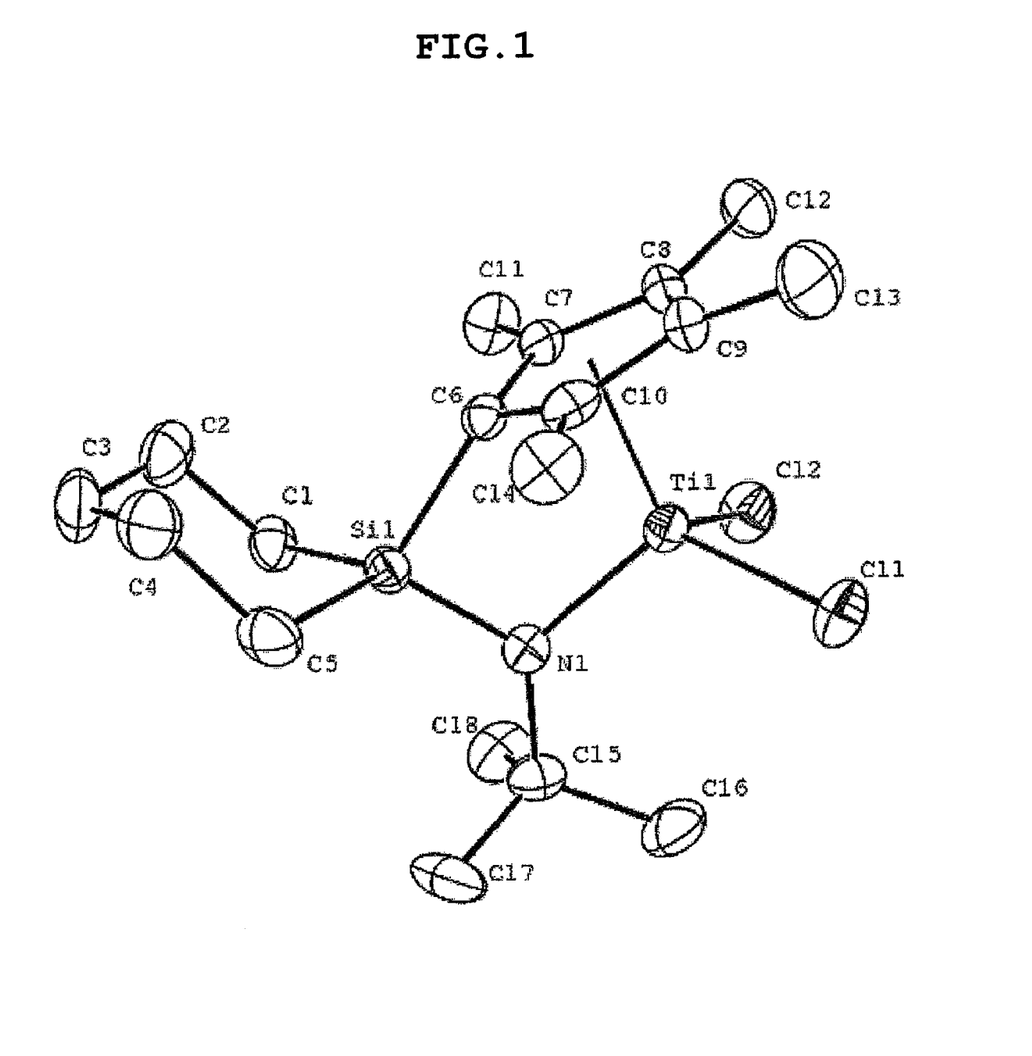
FIG. 1 shows the crystal structure of the (dichloro)((tert-butylamino)-2,3,4,5-tetramethyl cyclopentadienyl-silacyclohexyl)titanium(IV) catalyst prepared in Preparative Example 1 of the present invention.
Figure 2:
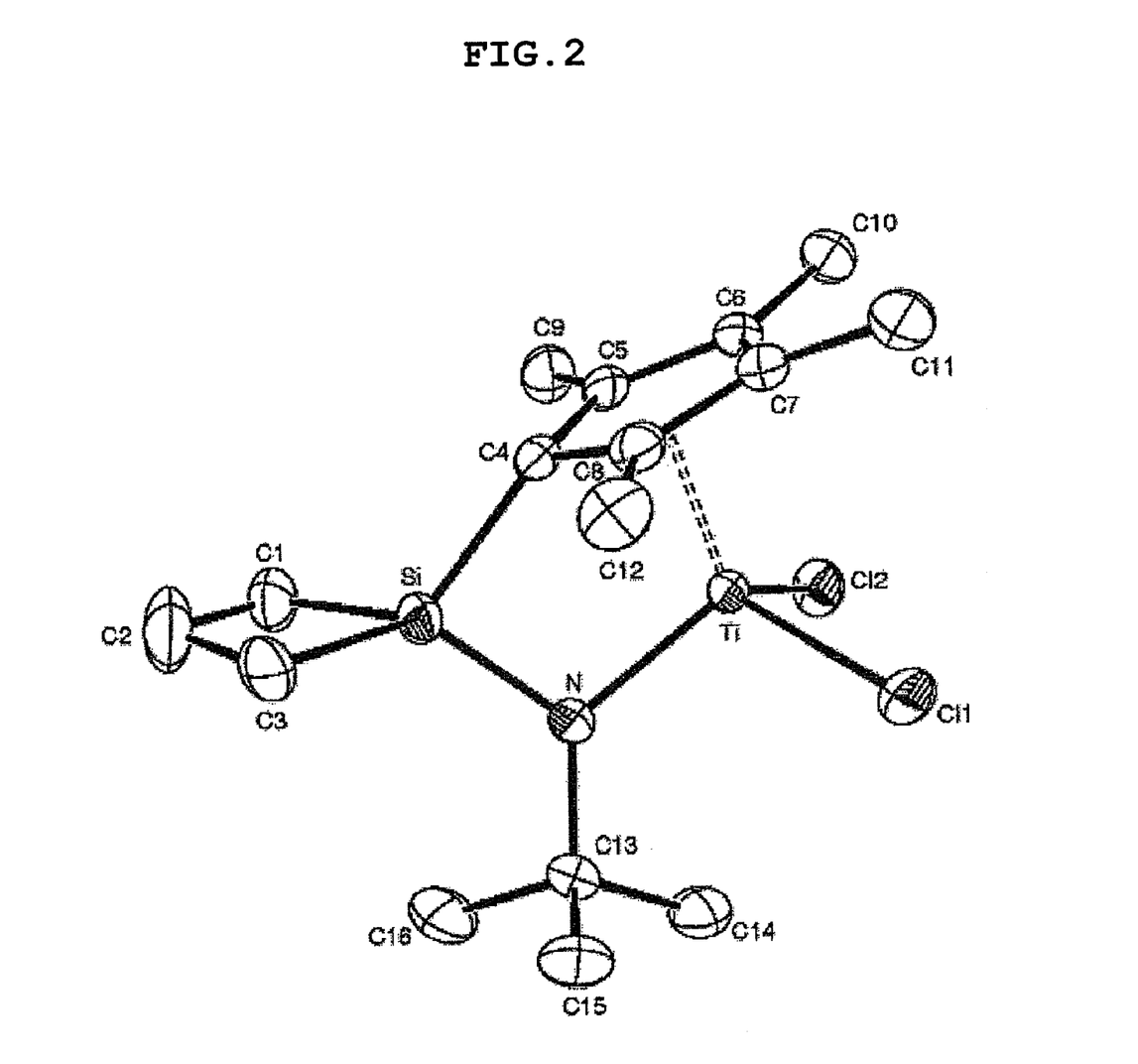
FIG. 2 shows the crystal structure of the (dichloro)(tert-butylamino)-2,3,4,5-tetramethyl cyclopentadienyl-silacyclobutyl)titanium(IV) catalyst prepared in comparative Example 1 of the present invention.
Figure 3:
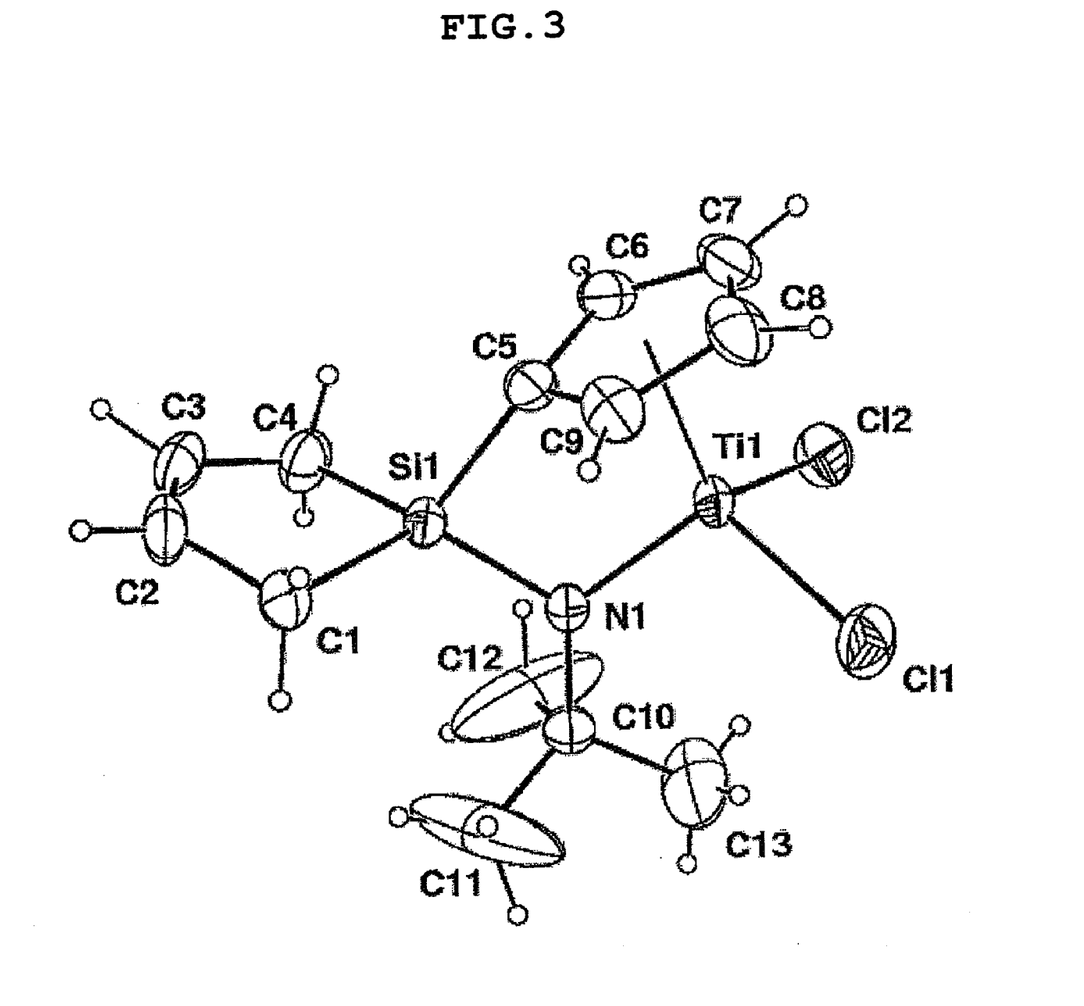
FIG. 3 shows the crystal structure of the (dichloro)((tert-butylamino)-2,3,4,5-tetramethyl cyclopentadienyl-silacyclo-3-pentenyl)titanium(IV) catalyst prepared in comparative Example 4 of the present invention.

(tert-Butylamido)(2,3,4,5-tetramethylcyclopenta-2,4-dienyl)silacyclohexane (7.42 g, 25.5 mmol) was dissolved in 100 ml of diethylether, and 10.2 ml of n-butyl lithium was added in droplets thereto at −78° C. The reaction temperature was gradually increased to room temperature, and the reaction mixture was allowed to react for 12 hours. After the completion of the reaction, the volatile material was removed, and the resultant reaction product was washed with hexane, thus obtaining 7.54 g of an orange solid. The solid thus obtained was dissolved in 100 ml of toluene, and 4.72 g of tetrachlorotitanium (IV) was added in droplets thereto at −78° C. The reaction temperature was increased to room temperature, and the reaction mixture was allowed to react for 7 hours. After the completion of the reaction, the volatile material was removed, and the resultant reaction product was extracted with purified pentane, recrystallized at −35° C., filtered, and then vacuum dried, thereby yielding 1.47 g of an orange solid. The crystal structure of the synthesized catalyst is shown in FIG. 1.

Yield: 12%, $^1$H-NMR (C$_6$D$_6$) δ=0.82-0.85 (t, 4H), 1.24 (m, 4H), 1.46 (s, 9H), 1.76 (m, 2H), 2.01 (s, 6H), 2.02 (s, 6H) ppm Example 2

Into a 500 ml stainless steel reactor which was sufficiently dried and then purged with nitrogen, 300 ml of n-heptane and 0.25 g of solid methylaluminoxane (available from Albemarle) were sequentially added. The temperature of the reactor was increased to 180° C., and 0.2 ml of a homogeneous solution of 5 mM (dichloro)((tert-butylamido)(2,3,4,5-tetramethylcyclopentadienyl)silacyclohexyl) titanium (IV) of Example 1 dissolved in n-heptane was added. Subsequently, the pressure in the reactor was adjusted to 30 atm using ethylene, and ethylene was continuously supplied to polymerize it. 10 min after initiation of the reaction, 10 ml of ethanol (containing 10 vol % aqueous hydrochloric acid solution) was added to terminate the polymerization. The reaction product was stirred with 1500 ml of ethanol for 4 hours, filtered and separated. The recovered reaction product was dried in a vacuum oven at 60° C. for 8 hours, thus obtaining 9.4 g of a polymer. The polymer had a melting point of 133.3° C., and the Mw thereof was determined to be 416,000 using gel chromatography, and the molecular weight distribution to be 7.5.

Example 3

Into a reactor prepared as in Example 2, 0.5 ml of triisobutylaluminum (available from Aldrich) and 200 mM n-heptane solution were introduced. The temperature of the reactor was increased to 140° C., after which the ethylene polymerization was conducted in the same manner as in Example 2, with the exception that 0.2 ml of a homogeneous solution of 5 mM (dichloro)((tert-butylamido)(2,3,4,5-tetramethylcyclopentadienyl)silacyclohexyl) titanium (IV) of Example 1 dissolved in n-heptane and 0.3 ml of triphenylmethylinium tetrakispentafluorophenyl borate (99%, Boulder Scientific) (5 mM toluene solution) were sequentially added, thus obtaining 9.9 g of a polymer. The polymer had a melting point of 134.0° C., and the Mw thereof was determined to be 327,000 using gel chromatography, and the molecular weight distribution to be 3.3.

Example 4

Copolymerization of Ethylene Monomer and 1-Octene

Into a reactor prepared as in Example 2, 15 ml 1-octene and 0.75 ml of triisobutylaluminum (available from Aldrich) and were introduced. The temperature of the reactor was increased to 140° C., after which the ethylene polymerization was conducted in the same manner as in Example 2, with the exception that 0.3 ml of a homogeneous solution of 5 mM (dichloro)((tert-butylamido)(2,3,4,5-tetramethylcyclopentadienyl)silacyclohexyl) titanium (IV) of Example 1 dissolved in n-heptane and 0.45 ml of triphenylmethylinium tetrakispentafluorophenyl borate (99%, Boulder Scientific) (5 mM toluene solution) were sequentially added, thus obtaining 9.9 g of a polymer. The polymer had a melting point of 123.1° C., density was 0.9282, and the Mw thereof was determined to be 282,000 using gel chromatography, and the molecular weight distribution to be 3.4.

Comparative Example 1

The polymerization was conducted under the same conditions as in Example 2, with the exception that 0.2 ml of a homogeneous solution of 5 mM (dichloro)((tert-butylamido) (2,3,4,5-tetramethylcyclopentadienyl)silacyclobutyl) titanium (IV) dissolved in n-heptane was used. The resultant polymer was dried, thus obtaining 5.5 g of a polymer, the Mw thereof being determined to be 409,000 using gel chromatography, and the molecular weight distribution to be 7.2.

Comparative Example 2

The polymerization was conducted under the same conditions as in Example 3, with the exception that 0.2 ml of a homogeneous solution of 5 mM (dichloro)((tert-butylamido) (2,3,4,5-tetramethylcyclopentadienyl)silacyclobutyl) titanium (IV) of dissolved in n-heptane was used. The resultant polymer was dried, thus obtaining 6.0 g of a polymer, the Mw thereof being determined to be 418,000 using gel chromatography, and the molecular weight distribution to be 3.0.

Comparative Example 3

The polymerization was conducted under the same conditions as in Example 2, with the exception that 0.2 ml of a homogeneous solution of 5 mM (dichloro)((tert-butylamido) (2,3,4,5-tetramethylcyclopentadienyl)silacyclo-3-pentenyl) titanium (IV) dissolved in n-heptane was used. The resultant polymer was dried, thus obtaining 5.5 g of a polymer and such a polymer had a melting point of 130.0° C., and the Mw thereof was determined to be 398,000 using gel chromatography, and the molecular weight distribution to be 7.9.

Comparative Example 4

The polymerization was conducted under the same conditions as in Example 3, with the exception that 0.2 ml of a homogeneous solution of 5 mM (dichloro)((tert-butylamido) (2,3,4,5-tetramethylcyclopentadienyl)silacyclo-3-pentenyl) titanium (IV) dissolved in n-heptane was used. The resultant polymer was dried, thus obtaining 6.7 g of a polymer. The polymer had a melting point of 131.9° C., and the Mw thereof was determined to be 392,000 using gel chromatography, and the molecular weight distribution to be 2.8.

Comparative Example 5

The polymerization was conducted under the same conditions as in Example 2, with the exception that 0.2 ml of a solution of 5 mM (dichloro)((dimethyl)(tert-butylamido) (2,3,4,5-tetramethylcyclopentadienyl)silyl) titanium (IV) dissolved in toluene was used. The resultant polymer was dried, thus obtaining 4.4 g of a polymer. The polymer had a melting point of 136.1° C., the Mw thereof being determined to be 350,000 using gel chromatography, and the molecular weight distribution to be 12.2.

Comparative Example 6

The polymerization was conducted under the same conditions as in Example 3, with the exception that 0.2 ml of a solution of 5 mM (dichloro)((dimethyl)(tert-butylamido) (2,3,4,5-tetramethylcyclopentadienyl)silyl) titanium (IV) dissolved in toluene was used. The resultant polymer was dried, thus obtaining 8.7 g of a polymer. The polymer had a melting point of 132.2° C., the Mw thereof being determined to be 404,000 using gel chromatography, and the molecular weight distribution to be 2.9.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A homogenous catalyst system, comprising:
   a homogenous catalyst which has stability under high temperature solution polymerization at 120-250° C. for producing an ethylene polymer represented by Formula 1 below, in which:
   a cyclopentadiene derivative and an electron donating substituent, both of which are bonded to a Group IV transition metal,
   are crosslinked through a silyl derivative substituted with a cyclic hydrocarbon, and tris(pentafluoro)borane cocatalyst, an aluminoxane cocatalyst and tris(pentafluoro) borane cocatalyst, or an organic alkyl aluminum and tris(pentafluoro)borane cocatalyst:

Formula 1 wherein M is a Group IV transition metal in the periodic table;
Cp is cyclopentadienyl or a derivative thereof, which is $\eta^5$-bonded to a central metal;
D is an electron donating substituent including any one element selected from the group consisting of nitrogen, phosphorus, oxygen, and sulfur, with a C1-C20 alkyl group;
X is a halogen atom, a C1-C20 alkyl group with the exception of Cp derivatives, a C7-C30 arylalkyl group, a C1-C20 alkyl-containing alkoxy group, a C3-C20 alkyl-substituted siloxy group, or a C1-C20 hydrocarbon-containing amido group;

m is 3; and n is 1 or 2 depending on an oxidation value of the transition metal, wherein aluminoxane or organic alkyl aluminum is mixed such that a molar ratio of central transition metal:boron atom:aluminum atom is 1:0.5-5:25-500.

2. The catalyst according to claim 1, wherein the aluminoxane cocatalyst is methylaluminoxane.

3. The catalyst system according to claim 1, wherein the aluminoxane is selected from the group of compounds represented by Formulas 2 and 3 below, and the organic alkyl aluminum is trimethylaluminum, triethylaluminum or tri-isobutylaluminum:

Formula 2

Formula 3 wherein $R^8$ is a C1-C20 alkyl group, and p and q are each an integer of 5 or more.

4. The catalyst system according to claim 1, wherein the catalyst has stability under high temperature solution polymerization at 140-210° C.

5. A method of producing an ethylene homopolymer or an ethylene copolymer with α-olefin using the catalyst system of claim 1, in which pressure in a reaction system is 10-150 atm, and polymerization is conducted at 120-250° C.

6. A method of producing an ethylene copolymer with α-olefin using the catalyst system of claim 1, in which α-olefin polymerized with ethylene monomer is at least one selected from the group consisting of 1-butene, 1-hexene, 1-octene, and 1-decene, and the copolymer has 60 wt % or more ethylene.

* * * * *